United States Patent
Forslund et al.

(10) Patent No.: US 10,197,997 B2
(45) Date of Patent: Feb. 5, 2019

(54) PARKING PROCEDURE

(71) Applicant: ROLLS-ROYCE AKTIEBOLAG, Kristinehamn (SE)

(72) Inventors: Michael Forslund, Kristinehamn (SE); Anders Eriksson, Kristinehamn (SE)

(73) Assignee: Rolls-Royce AB (SE)

( * ) Notice: Subject to any disclaimer, the term of this patent is extended or adjusted under 35 U.S.C. 154(b) by 43 days.

(21) Appl. No.: 15/315,715

(22) PCT Filed: Jun. 3, 2015

(86) PCT No.: PCT/EP2015/062454
§ 371 (c)(1),
(2) Date: Dec. 1, 2016

(87) PCT Pub. No.: WO2015/185667
PCT Pub. Date: Dec. 10, 2015

(65) Prior Publication Data
US 2017/0185080 A1    Jun. 29, 2017

Related U.S. Application Data

(60) Provisional application No. 62/007,424, filed on Jun. 4, 2014.

(30) Foreign Application Priority Data

Jul. 2, 2014 (SE) ..................................... 1450820
Jul. 2, 2014 (SE) ..................................... 1450821

(51) Int. Cl.
G05D 1/00 (2006.01)
B63H 11/11 (2006.01)
G05G 5/05 (2006.01)
G05D 1/02 (2006.01)
(Continued)

(52) U.S. Cl.
CPC ............ G05D 1/0011 (2013.01); B63B 59/08 (2013.01); B63G 8/001 (2013.01); B63G 8/08 (2013.01);
(Continued)

(58) Field of Classification Search
CPC ...................................................... G05D 1/011
See application file for complete search history.

(56) References Cited

U.S. PATENT DOCUMENTS 5,246,392 A    9/1993    Johnston
5,720,635 A    2/1998    Roos
(Continued)

OTHER PUBLICATIONS

International Search Report issued in International Patent Application No. PCT/EP2015/062454 with dated Sep. 4, 2015.
(Continued)

*Primary Examiner* — Adam D Tissot
*Assistant Examiner* — Michael A Berns
(74) *Attorney, Agent, or Firm* — Eric L. Sophir; Dentons US LLP

(57) ABSTRACT

Various aspects provide for "parking" an apparatus in a parking configuration. A parking configuration may be a configuration of an apparatus that minimizes damage (e.g., corrosion, wear, and the like) resulting from extended exposure during periods of inactivity. An apparatus may comprise a propulsion system (e.g., for a ship) and/or a steering system. An apparatus may comprise a linkage or other device positioned by an actuator. Some aspects include a water jet based propulsion system having a scoop and a nozzle operable to redirect the water jet, providing a range of forward/backward and port/starboard thrusts.

26 Claims, 9 Drawing Sheets

(51) Int. Cl.
*B63G 8/00* (2006.01)
*B63G 8/08* (2006.01)
*B63H 11/02* (2006.01)
*B63H 21/17* (2006.01)
*F15B 11/12* (2006.01)
*F15B 20/00* (2006.01)
*F15B 21/02* (2006.01)
*B63B 59/08* (2006.01)
*B63H 25/26* (2006.01)

(52) U.S. Cl.
CPC .............. *B63H 11/02* (2013.01); *B63H 11/11* (2013.01); *B63H 21/17* (2013.01); *B63H 25/26* (2013.01); *F15B 11/12* (2013.01); *F15B 20/00* (2013.01); *F15B 21/02* (2013.01); *G05D 1/0206* (2013.01); *G05G 5/05* (2013.01); *B63B 2751/00* (2013.01); *B63B 2755/00* (2013.01); *B63G 2008/005* (2013.01); *F15B 2211/85* (2013.01)

(56) References Cited

U.S. PATENT DOCUMENTS

| | | | |
|---|---|---|---|
| 5,892,338 | A | 4/1999 | Moore et al. |
| 6,174,210 | B1* | 1/2001 | Spade ............. B63H 11/11 |
| | | | 114/284 |
| 2001/0029134 | A1 | 10/2001 | Moffet |
| 2008/0189001 | A1 | 8/2008 | Morvillo |
| 2011/0159752 | A1* | 6/2011 | Ota .................. B63H 11/08 |
| | | | 440/41 |
| 2012/0197467 | A1 | 8/2012 | Morvillo |
| 2013/0218376 | A1 | 8/2013 | Morvillo |
| 2014/0028240 | A1* | 1/2014 | Heunnann ........... H02J 7/0052 |
| | | | 320/101 |
| 2014/0365050 | A1 | 11/2014 | Morvillo |
| 2017/0121000 | A1* | 5/2017 | Forslund ............ B63H 11/11 |

OTHER PUBLICATIONS

Written Opinion of the International Searching Authority issued in International Patent Application No. PCT/EP2015/062454 with dated Sep. 4, 2015.
Swedish Office Action issued in Patent Application No. 1450821-2 dated Oct. 15, 2015.
Swedish Office Action issued in Patent Application No. 1450821-2 dated Apr. 17, 2015.
Response to International Search Report and Written Opinion filed in European Patent Application No. 15726965.5 dated Dec. 29, 2016.
Swedish Office Action, dated Sep. 14, 2018, issued in corresponding Swedish Application No. 1450821-2, 6 pages.

* cited by examiner

PARKING PROCEDURE

This application is a National Stage of PCT/EP2015/062454, filed Jun. 3, 2015, entitled "PARKING PROCEDURE," which claims priority to Swedish Patent Application No. 1450820-4, filed Jul. 2, 2014, and claims priority to Swedish Patent Application No. 1450821-2, filed Jul. 2, 2014, and claims priority to U.S. Provisional Patent Application Ser. No. 62/007,424, filed Jun. 4, 2014, all of which are incorporated by reference in their entirety.

BACKGROUND

1. Technical Field

The present invention relates generally to automated parking, and more particularly to positioning apparatus during periods of inactivity.

2. Background

Equipment may be used for periods of time, between which the equipment may be stored or otherwise stationary. Various problems may occur with stationary apparatus. A person walking, boating, or swimming by an apparatus may interact with the apparatus in an unsafe manner. The weather may change in a way that requires a response by the apparatus. Surfaces may be damaged by damage processes. Marine systems may be susceptible to damage processes associated with seawater, including growth of cellular organisms (barnacles, algae, coral, and other marine growth), and the like. In some cases, damage may be caused by the process per se. In some cases, a product of the damage process (e.g., particles of metal, oxide, a hydroxide, salt, and the like) may cause damage (e.g., if the product of the process abrades or contaminates parts of the system).

Some degradation processes may be localized to a contact area between different components. When damaged, this contact area may perform poorly. For example, a hydraulic cylinder may include a piston, a barrel, and an annular seal that seals the piston within the barrel. The seal may include a ring-shaped contact area between a sealing ring and the piston (or the barrel). Damage processes may degrade this contact area, which may degrade the seal, reducing performance.

A variety of apparatus use hydraulic cylinders that are exposed to degrading environments. Marine systems may use hydraulic cylinders in a variety of implementations, including immersion in seawater for long times. Corrosion and/or surface growth of organisms may be problematic in marine environments, particularly at contact areas between parts, such as those between components that slide past each other (e.g., a seal around a piston in a hydraulic cylinder). The reduction of such damage may improve the performance and/or lifetime of a product being used in a corrosive environment. This improvement may reduce the lifetime costs associated with a system, particularly a large system (e.g., a ship propulsion system) that may be remotely deployed and/or time consuming to repair.

U.S. Pat No. 5,892,338 describes a radio frequency remote control for trolling motors. U.S. Pat. No. 5,246,392 describes a stern drive system with anti-rotation device. U.S. Pat. No. 5,720,635 describes a marine jet drive.

SUMMARY OF THE INVENTION

Various aspects provide for "parking" an apparatus in a parking configuration, which may be an arrangement of various components of an apparatus (actuators, actuated linkage, objects connected to the linkage or actuators, and the like). A parking configuration may be a configuration that minimizes environmental damage associated with a surface degradation process (e.g., marine growth, corrosion, wear, and the like) resulting from exposure to an environment during periods of inactivity. A parking configuration may be a configuration that enhances safety of an apparatus. A parking configuration may include a plurality of configurations, and motion between those configurations may reduce damage. A parking configuration may include a configuration that is rarely used or needed during operation of the apparatus, and so the parked configuration may result in environmental damage being localized to portions of the apparatus that are infrequently used. A parking configuration may be selected based on a frequency of configurations of an apparatus or lengths of an actuator, by incorporating data associated with a duty cycle of an apparatus (e.g., how the apparatus is being used or expected to be used).

An exemplary apparatus may comprise a propulsion system, which may comprise a propulsion apparatus and a steering apparatus, either of which may include a water jet. In some cases, a propulsion apparatus and a steering apparatus interact with the same jet of water. In some cases, a propulsion apparatus operates with a first jet, and a steering apparatus operates with a second jet. A steering apparatus may include a rudder.

Various embodiments describe a computer implemented method, which may comprise receiving an instruction to park an apparatus in a parking configuration, identifying a desired parking configuration, and actuating the apparatus (or instructing the apparatus) to position itself in a parking configuration. Various sensors may provide information that is incorporated into the parking procedure and/or monitoring of the parked apparatus. Some embodiments comprise a platform, which may include a combination of hardware and software that runs on the hardware to create a unique machine having novel and inventive capabilities.

A system may comprise an actuator having a working range coupled to an apparatus and configured to position the apparatus in a configuration within a range of motion of the apparatus. A computer readable non-transitory storage media (e.g., magnetic disc, film, or tape or other solid state device) may be coupled to a processor and the actuator, and have embodied thereon instructions executable by the processor to perform a method. The method may comprise receiving an instruction to park the apparatus (e.g., from a command console used to control the apparatus), identifying a parking configuration for the apparatus, and instructing the actuator to move to a length (or position) in its working range that positions or otherwise moves the apparatus to a parking configuration.

At least a portion of the apparatus (e.g., an actuator) may be disposed in a corrosive environment (e.g., in salty air, beneath the surface of the sea, in brackish water, and the like). A portion of an apparatus (e.g., a control portion) may be disposed remotely with respect to the portion disposed in the corrosive environment. For example, an actuator may be disposed below the surface of the water, and a computing platform may be disposed above the surface (e.g., at a bridge, command center, and the like).

In an exemplary embodiment, an apparatus is associated with a marine apparatus, such as a vessel (e.g., a boat, ship, or submarine). The apparatus may be mobile and/or stationary. At least a portion of the apparatus (e.g., an actuator) may be disposed in a corrosive environment (e.g., salty air, saltwater, brackish water, produced water, and the like). The apparatus may include a linkage actuated by the actuator (e.g., a lever arm, a piston, and the like). In an embodiment, the apparatus includes at least one of a propulsion and a navigation apparatus (either or both of which may include a water jet). An actuator may include an electrically driven actuator, such as a solenoid, a lead screw, and the like. An actuator may include a hydraulic cylinder.

The present description incorporates by reference U.S. provisional patent application No. 62/007,424, filed Jun. 4, 2014, Swedish patent application no. 1450820-4, filed Jul. 2, 2014, and Swedish patent application no. 1450821-2, filed Jul. 2, 2014.

DETAILED DESCRIPTION OF THE INVENTION

Various aspects may reduce damage of various systems, particularly localized damage of contact areas (e.g., wear of parts moving against each other). Damage of a surface may include surface corrosion, crevice corrosion, galvanic corrosion, film deposition, marine growth (e.g., living cells), dissolution of at least a portion of (e.g., a passivation layer on) a surface, and the like. Multiple damage processes may occur in parallel, often at different rates. Marine growth may nucleate in a few days, yet take weeks to months to become significant. Corrosion may begin within minutes, becoming significant within weeks. Dissolution of a passivation layer (e.g., in an oxygen-poor environment beneath a seal) may begin within seconds, yet take days to weeks to become significant. Various embodiments incorporate the kinetics of multiple damage processes and choose parking configurations that eliminate, reduce, and/or repair the damage from these processes.

Damage processes may be repaired in some embodiments. A seal (e.g., with a wiper) may be "swept" over a piston's full working range in a few seconds to "wipe away" marine growth. Exposure of a de-passivated surface to an oxidizing environment may repassivate the surface in seconds to minutes. A parking configuration may provide for repairing a damaged surface, particularly when the repair kinetics (e.g., wiping away marine growth, repassivating) are faster than the damage kinetics (e.g., growth of marine growth, depassivation).

A parking configuration for an apparatus may be a configuration of the apparatus in which it is desirable to leave the apparatus during periods of inactivity. A parking configuration may be a plurality of localized positions among which an apparatus moves in a manner that prevents damage associated with stagnation. A parking configuration may be a configuration that, were damage to occur, minimizes the subsequent damage caused by that corrosion during operation (e.g., by restricting the degradation process to an area that is seldom, or even never, used in operation). A parking configuration may be a series of positions and/or movements that repair damage. A parking configuration may be used for problems other than damage per se (e.g., fatigue, equipment safety, position demarcation, and the like).

Systems and methods described herein may be incorporated into a wide variety of apparatus. For simplicity, select embodiments are described using marine apparatus actuated by hydraulic cylinders. Embodiments may include other apparatus (e.g., aircraft, vehicles, construction equipment) and/or other actuators (e.g., electric, such as solenoid, ball and screw, and the like)

Figure 1A:
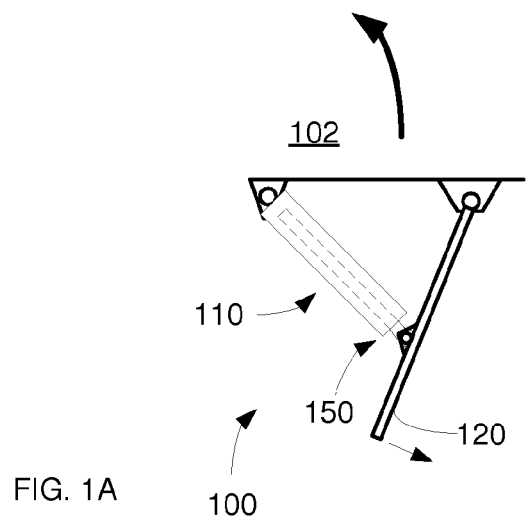
FIGS. 1A, 1B, and 1C are graphical representations of an exemplary apparatus, according to some embodiments.
Figure 1B:
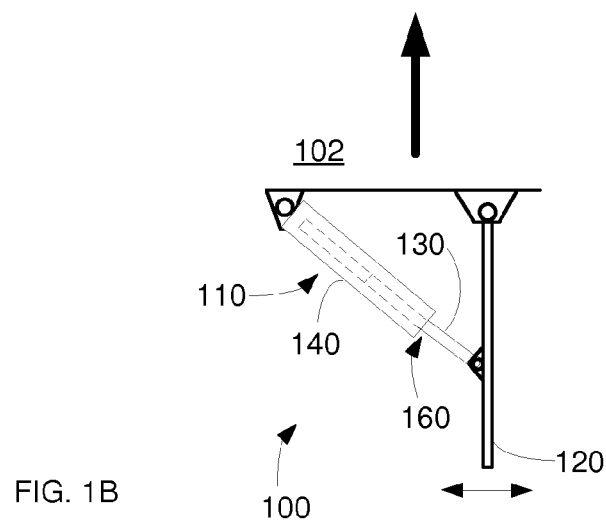
Figure 1C:
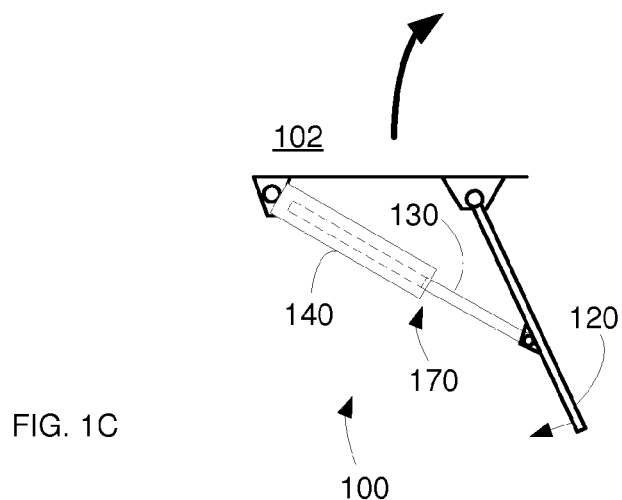

FIGS. 1A, 1B, and 1C are graphical representations of an exemplary apparatus, according to some embodiments. Various embodiments may be directed toward a wide range of applications, such as controlling an aileron on an airplane, a bucket on a wheel loader, a positioning device on a marine apparatus, and the like. For convenience, various embodiments are described in the context of marine control systems, such as may be used for navigation. In exemplary FIGS. 1A, 1B, and 1C, steering system 100 may be connected to a marine apparatus, such as a vessel 102 (e.g., a boat, submarine apparatus, a ferry, a dock (e.g., having a movable ramp), a ship, an oil rig, a barge, a bridge (e.g., a drawbridge or otherwise adjustable bridge) and the like). An actuator may control landing gear on an aircraft. An actuator may control pitch, yaw, rotation, and/or other navigative characteristics (e.g., controlling a drone aircraft or submarine). An actuator may control steering of a vehicle (e.g., an automobile, a truck, a tank, and the like). An actuator may control a lock (e.g., in a canal), a dam, a gate, a valve, and the like. Steering system 100 may be in communication with a command console (not shown) used to control vessel 102. System 100 includes an actuator (e.g., a hydraulically actuated cylinder 110) that actuates a component (e.g., rudder 120) or other apparatus (e.g., a propeller pod, a water jet, a lever arm, a linkage, and the like) over a range of motion (that in this case, steers the boat). For an exemplary hydraulic actuator, cylinder 110 includes a piston 130 and barrel 140 (FIG. 1B). In system 100, one end of cylinder 110 is coupled to an apparatus (e.g., vessel 102) and the other end (in this case, the exterior end of piston 130) is attached to the component being actuated (e.g., rudder 120). A length between the ends of cylinder 110 is varied by sliding piston 130 within barrel 140. This length and associated force positions rudder 120 in a manner that steers vessel 102. In this example, a cylinder couples directly with a component (in this case, a rudder). In some embodiments, a cylinder actuates an apparatus via a mechanical linkage (e.g., arms and pivots) that transfers force and displacement from the cylinder to the component being actuated.

A design specification for an apparatus typically includes a specified range of motion through which the apparatus operates, and by extension, a working range (e.g., from fully retracted to fully extended) over which an actuator actuates the apparatus. An actuator may be positioned at various lengths (e.g., positions) within its working range to actuate the apparatus to various configurations in the range of motion of the apparatus.

The specification for an apparatus may also include constraints on dimensions that prevent damage. For example, a truck or car may require a desired turning radius, and thus its associated steering linkage, wheels, and the like will be specified with a range of motion that allows the vehicle to turn accordingly, yet not allow contact between tires and wheel wells. In exemplary system 100, a design specification for vessel 102 defines a range of motion and dimensions for system 100, including a specified working range for cylinder 110. Cylinder 110 may be positioned at various lengths within its working range, actuating rudder 120 to various positions in its range of motion, that vary to steer vessel 102 in directions from full port (FIG. 1A, cylinder 110 at length 150) through straight ahead (FIG. 1B, length 160) to full starboard (FIG. 1C, length 170).

Figure 2A:
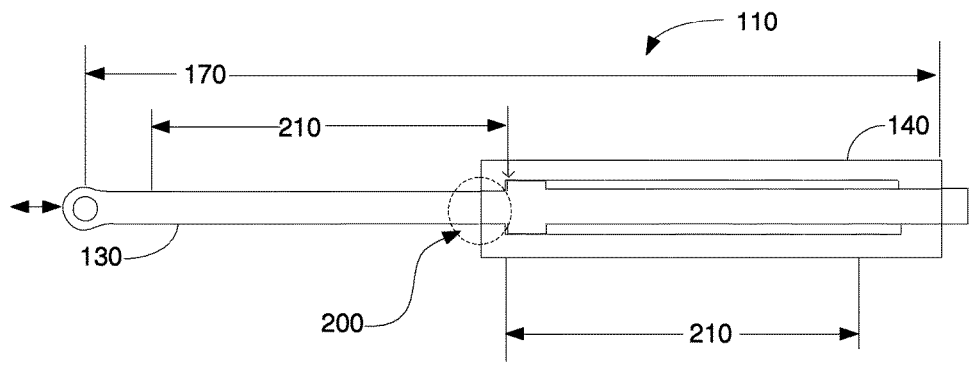
FIG. 2A-C are schematic illustrations of a hydraulic cylinder, according to some embodiments.
Figure 2B:
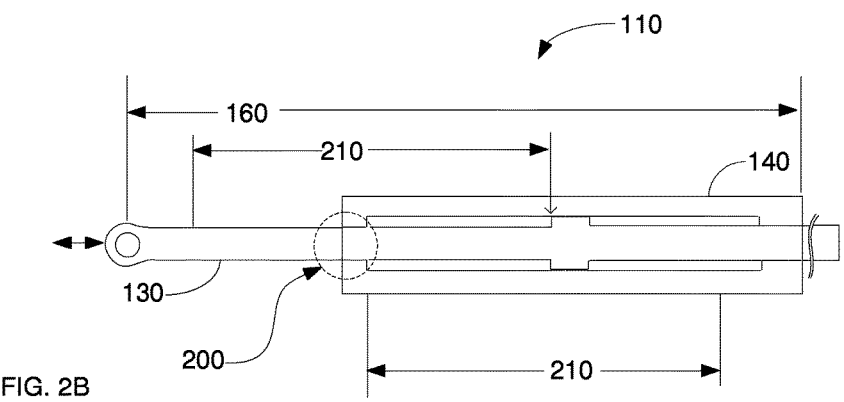
Figure 2C:
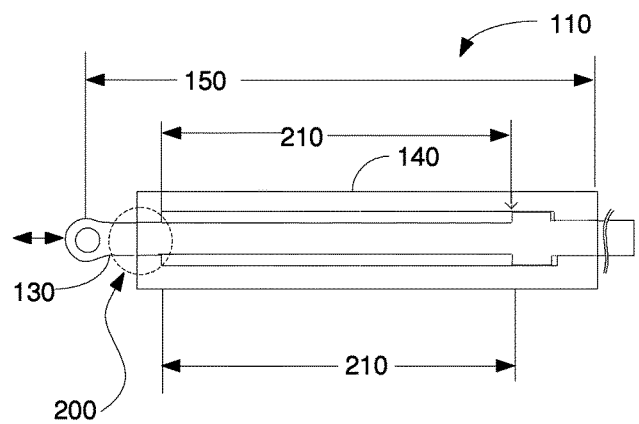

FIG. 2A-C are schematic illustrations of a hydraulic cylinder, according to some embodiments. FIG. 2A illustrates cylinder 110 at one end of its working range 210, length 170. FIG. 2B illustrates cylinder 110 at the middle of its working range 210, length 160. FIG. 2C illustrates cylinder 110 at the other end of its working range 210, length 150. Cylinder 110 may incorporate a buffer zone (not annotated) to prevent inadvertent contact between working parts.

A sealing region 200 may be associated with a seal (not shown) between piston 130 and barrel 140. A seal between the barrel and piston of the cylinder may allow the piston to slide while ostensibly preventing the passage of material (e.g., hydraulic fluid, dust, water, contaminants) from one side of the seal to the other.

A sealing region may be susceptible to damage processes, which may create a degradation product (e.g., at a contact area beneath the seal). Some seals comprise materials that may corrode and/or induce corrosion. With a metallic seal contacting a piston of a dissimilar material, galvanic corrosion between the seal and the piston may damage the contact area between the seal and the piston (e.g., corroding the seal or corroding the piston). A seal may create a localized chemical environment that may degrade the surface contacted by the seal (e.g., remove a passivation layer on the piston). Marine growth may form around or beneath a seal.

Figure 3:
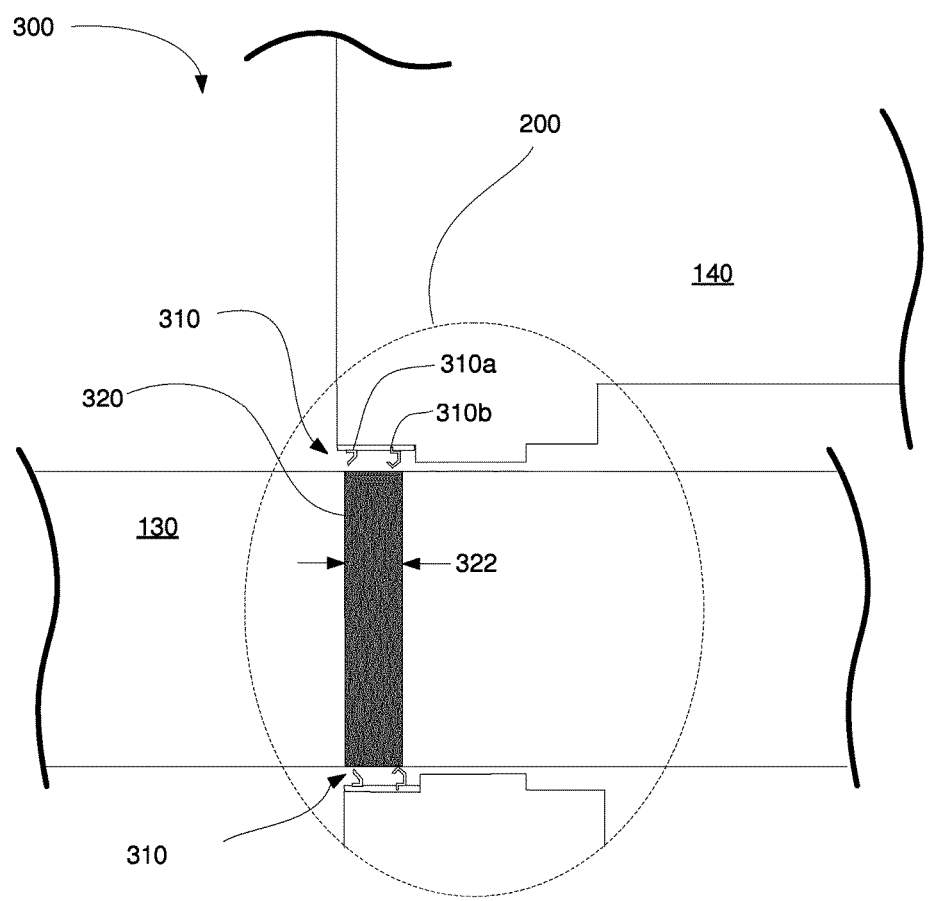
FIG. 3 schematically illustrates a degradation product associated with a sealing region, according to some embodiments.

FIG. 3 schematically illustrates a degradation product associated with a sealing region, according to some embodiments. In cylinder 300, a sealing region 200 is associated with a seal between piston 130 and barrel 140. Sealing region 200 includes a seal 310 (e.g., an annular contact area) between piston 130 and barrel 140. Seal 310 may include a wiper 310*a* (e.g., brass), which may be separated from piston 130 by a gap of 0.5-1 mm. Seal 310 may include a gasket 310*b* (e.g., rubber or plastic) which may contact piston 130. Seal 310 may include multiple wipers 310*a* and/or multiple gaskets 310*b*. In some cases, the wiper is exterior with respect to the seal; in other cases, the wiper is interior with respect to the seal. In some embodiments (e.g., as shown) seal 310 is attached to barrel 140, and piston 130 slides against seal 310. A cylinder may have a plurality of seals 310. Seal 310 may be attached to piston 130, both of which slide within barrel 140.

At times, (e.g., during periods of inactivity), degradation products 320 (shown schematically) may form at a contact area between seal 310 and (in this example) piston 130. Degradation products 320 may have a shape associated with this contact area (e.g., degradation products 320 may be an annular ring of width 322 around a circumference of piston 130). Width 322 of degradation products 320 may be approximately the width of wiper(s) 310*a*, a width of seal(s) 310*b*, and/or a width of seal(s) 310 (e.g., 1-10 mm, including 1-5 mm, including 2-4 mm). Width 322 may be 1 mm to 20 cm, including 3 mm to 3 cm, including 5 mm to 1 cm in width). During use, sliding of degradation products 320 beneath seal 310 (e.g., as piston 130 moves) could damage various components of seal 310 or otherwise impair performance. For example, an abrasive degradation product 320 may abrade seal 310 as it passes beneath during use.

Figure 4:
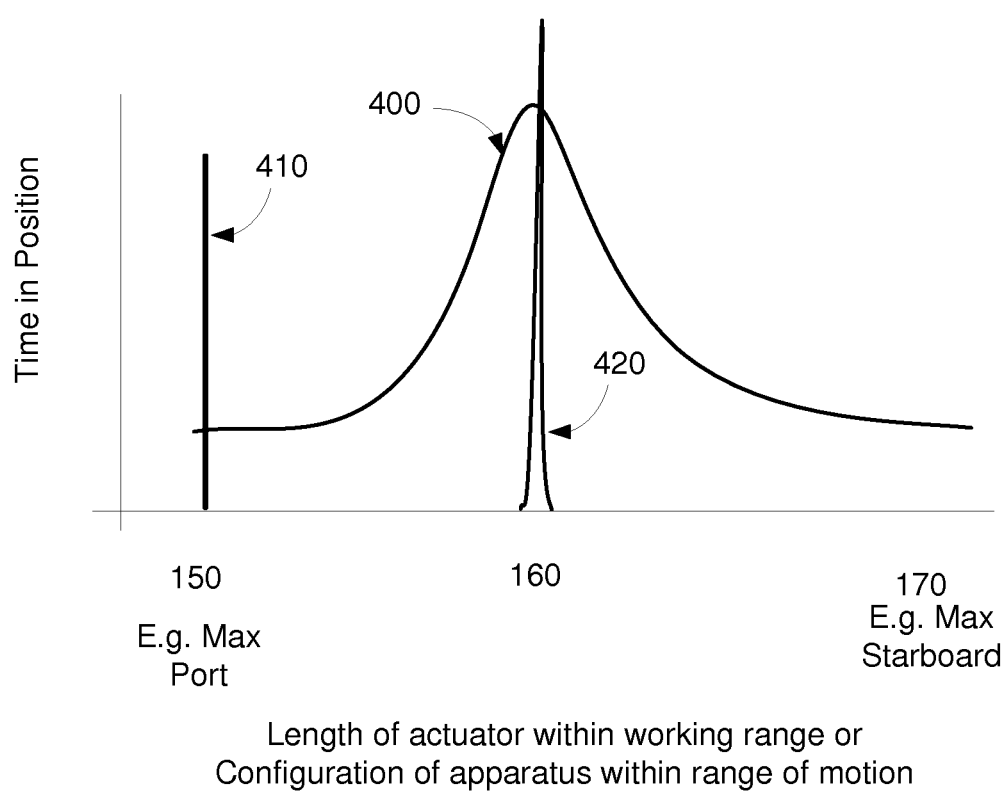
FIG. 4 illustrates an incorporation of duty cycle information into a parking configuration, according to some embodiments.

FIG. 4 illustrates an incorporation of duty cycle information into a selection of a parking position, according to some embodiments. How a cylinder is used (e.g., the type of apparatus it actuates) may affect degradation of the cylinder. A cylinder operating a backhoe may have a different duty cycle than one lifting the bed of a dump truck. A cylinder steering an outboard motor may have a different duty cycle than one controlling a rudder on a sailboat. Historical or predicted data on frequency of positions, configurations, or lengths may be incorporated into the selection of a parking configuration. Exemplary response 400 represents a frequency of configurations for an apparatus (e.g., steering system 100, FIG. 1A-C), and by extension, frequency of lengths within a cylinder's working range (e.g., cylinder 110) and by extension, frequency of time spent by a given portion of a piston beneath a seal (e.g., piston 130 beneath seal 310, FIG. 3). A frequency of configurations may be determined from an historical record of an apparatus (e.g., continuous logging of how the apparatus is being used). A frequency of configurations may be dynamically updated as the apparatus is used, and may be incorporated into a continual recalculation of parking configurations as a function of use, environment, and the like. In some cases, a canonical or benchmark frequency of configurations may be determined from a benchmark apparatus (e.g., other than the particular apparatus being used), which may be determined at an earlier time.

A frequency of configurations may be used to identify a rarely used configuration in which an apparatus may be parked. A rarely used configuration may be a configuration that is used less than 20%, less than 10%, less than 5%, less than 1%, less than 0.1%, or preferably less than 0.01% of the time (e.g., according to an expected or historical frequency of operating configurations).

For example, FIG. 4 may be described in the context of a steering system used to navigate a ship among directions ranging from full port to full starboard. In exemplary response 400, vessel 102 is expected to spend most of its time moving straight ahead, with relatively less time making sharp turns to port or starboard. As such, cylinder 110 is expected to spend large amounts of time near length 160 (its midpoint), and relatively less time near rarely used lengths 150 and lengths 170 (its endpoints).

Historical duty cycle information may be logged and used to calculate a frequency of configurations or lengths. For example, apparatus configuration (e.g., heading) and/or actuator length may be logged and stored over a period of time (days, weeks, months, years). In some cases, these data are logged from an apparatus currently being operated (and a new parking configuration may be determined each time the apparatus is parked). In some cases, a benchmark or canonical apparatus is used to generate an estimated frequency of configurations, and these benchmark data are used to select a parking configuration.

In FIG. 4, parking response 410 represents actual or expected time spent parked in this rarely used configuration, differentiating between "time parked" represented by response 410 and the "time operating" represented by response 400. Parking in the rarely used configuration may segregate damage that may occur in this configuration to portions of the apparatus and actuator rarely used in operation. A degradation product that forms in sealing region 200 when an actuator is at a rarely used length (e.g., when piston 130 is fully retracted as in FIG. 1A or 2C) may only infrequently pass beneath the seal during normal operation. An apparatus may identify such a rarely used configuration and park itself in such a configuration. In some cases, a platform may include lockout hardware or software that prevents an actuator from moving to a parking length during normal operation, such that the damaged region does not pass beneath the seal during operation.

Exemplary frequencies of configurations and/or lengths are shown for illustrative purposes. Different apparatus may have different duty cycles, and so have different frequencies of configurations/lengths. A cylinder lifting a bucket on a wheel loader may have a duty cycle different than that of a cylinder controlling the landing gear on an aircraft. A ferry door cylinder may have a different duty cycle than a tractor accessory cylinder.

A frequency of configurations may be matched to an expected use of a new apparatus, and a predicted duty cycle may be estimated based on an historical duty cycle. An expected frequency of lengths of an actuator (or configurations of an apparatus) may be estimated based on previously logged position frequencies.

Figure 5:
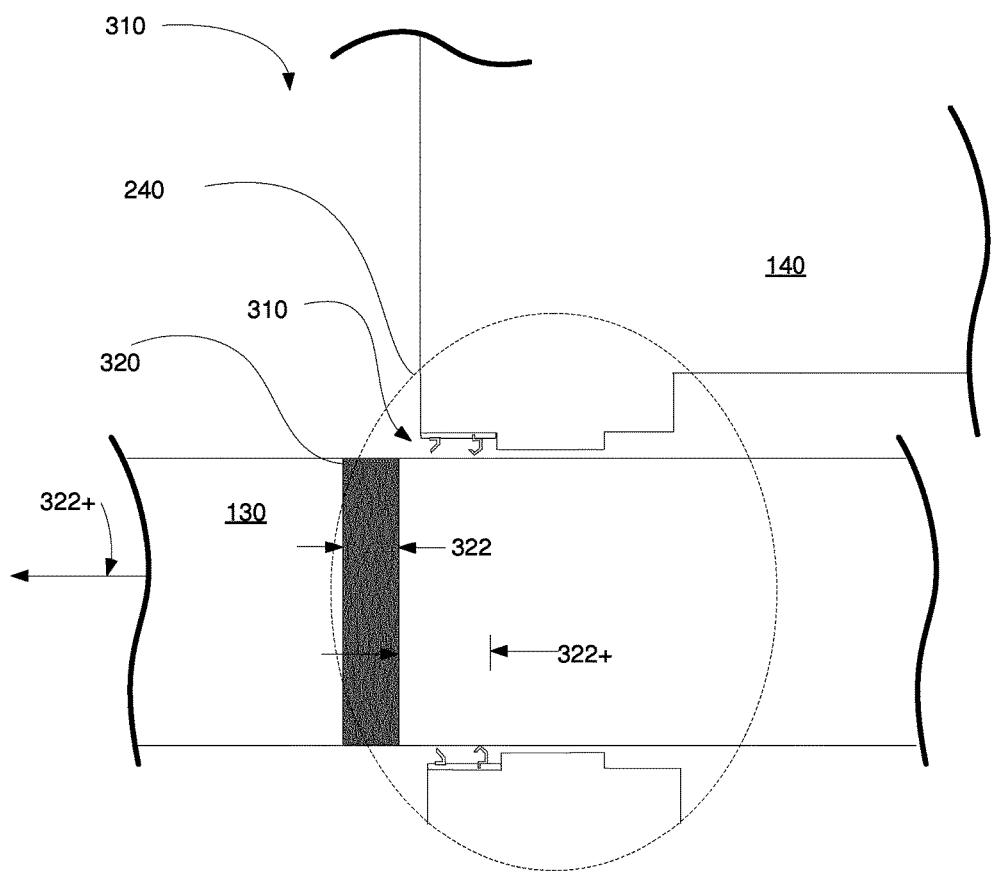
FIG. 5 illustrates an exemplary modification within a parking configuration, according to some embodiments.

FIG. 5 illustrates an exemplary modification within a parking configuration, according to some embodiments. Some degradation processes (e.g., dissolution of a passivating layer, marine growth) may occur beneath or around a seal after extended periods of stationary time (e.g., days, weeks, or even months). In some cases, this degradation may be prevented by periodically adjusting cylinder length (changing the configuration of the apparatus). For example, a passivating layer beneath a seal may dissolve after an extended period of stationary time. The passivating layer may be renewed by exposing the area beneath the seal to the ambient environment (outside the localized environment beneath the seal that induces dissolution). An apparatus may incorporate historical, predicted (e.g., modeled) and/or sensor data to, during extended periods of parking, periodically move itself (e.g., to reform a passivation layer).

Marine growth may form over an area outside a seal (e.g., over the portion of the piston exposed to seawater). A parking configuration may comprise activating an actuator to "wipe" or "sweep" away marine growth by moving the actuator through its entire range of motion (e.g., sweeping a cylinder from fully retracted to fully extended) such that the seal (e.g., the wiper) removes marine growth. A system may instruct an actuator to sweep through its full working range (e.g., from fully retracted to fully extended). Sweeping may be combined with other parking positions (e.g., sweeping an actuator every week, and moving the actuator to a different position after each sweep).

To modify a parking configuration, piston 130 may be extended or retracted (with respect to barrel 140) a distance 322+ that is at least width 322 of degradation products 320. Extension distance 322+ may be more than 500 microns, 1-20 mm, including 3-15 mm, more than 1 mm, 3-8 mm, 5-15 mm, 1 cm -5 cm, and the like. Distance 322+ may be at least 2% of the working range (e.g., 2-5%). Distance 322+ may be 0.5% to 10% of the working range, including 1%-8%, including 3%-6%. A cylinder may be actuated after a period of time, e.g., every hour, every day, every week, every 10 days, every two weeks, every month, every two months, or even every year, according to the kinetics of the degradation process to be avoided. A sensor may provide at time used to modify a parking configuration.

In some embodiments, available parking positions are constrained to an "inner" portion of the working length of an actuator, such that the actuator is not parked at a fully extended or fully retracted position (e.g., the cylinder is not parked within distance 322+ of an end of its working range). Such a configuration may provide for sweeping the parking position. A parked actuator may constrained to be at least 0.5%, 1%, 2%, or even 3% from an end of its working range.

Referring to FIG. 4, a parking configuration may comprise a plurality of modified parking configurations. In some cases, time spent in each of the plurality may be logged. Response 420 illustrates an exemplary frequency of configurations within a parking configuration, according to some embodiments. As represented by response 420, small motions about a central parking configuration may be used to (for example) re-passivate a damaged passivation layer or otherwise prevent degradation. Response 420 may be located in a frequently used configuration (e.g., as in FIG. 4). Response 420 may be located in a rarely used configuration (e.g., full port of full starboard, FIG. 4).

Figure 6:
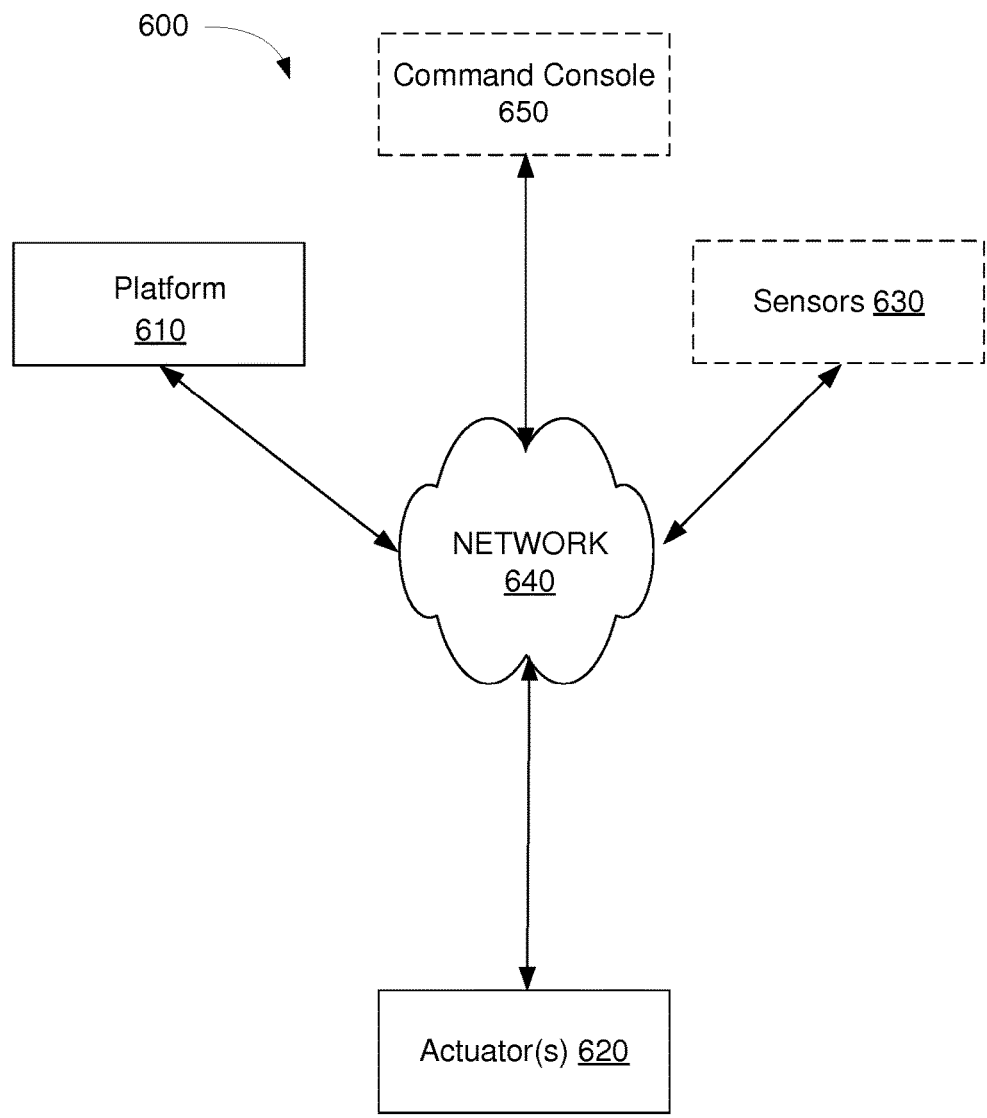
FIG. 6 illustrates a system, according to some embodiments.

FIG. 6 illustrates a system, according to some embodiments. System 600 includes a platform 610, actuators 620, and optionally sensors 630. These components communicate via a network 640, which may also provide for communication between the system and a command console 650 (e.g., to command a vessel). Command console 650 may be integrated with system 600 or may be a device separate from system 600.

Figure 7:
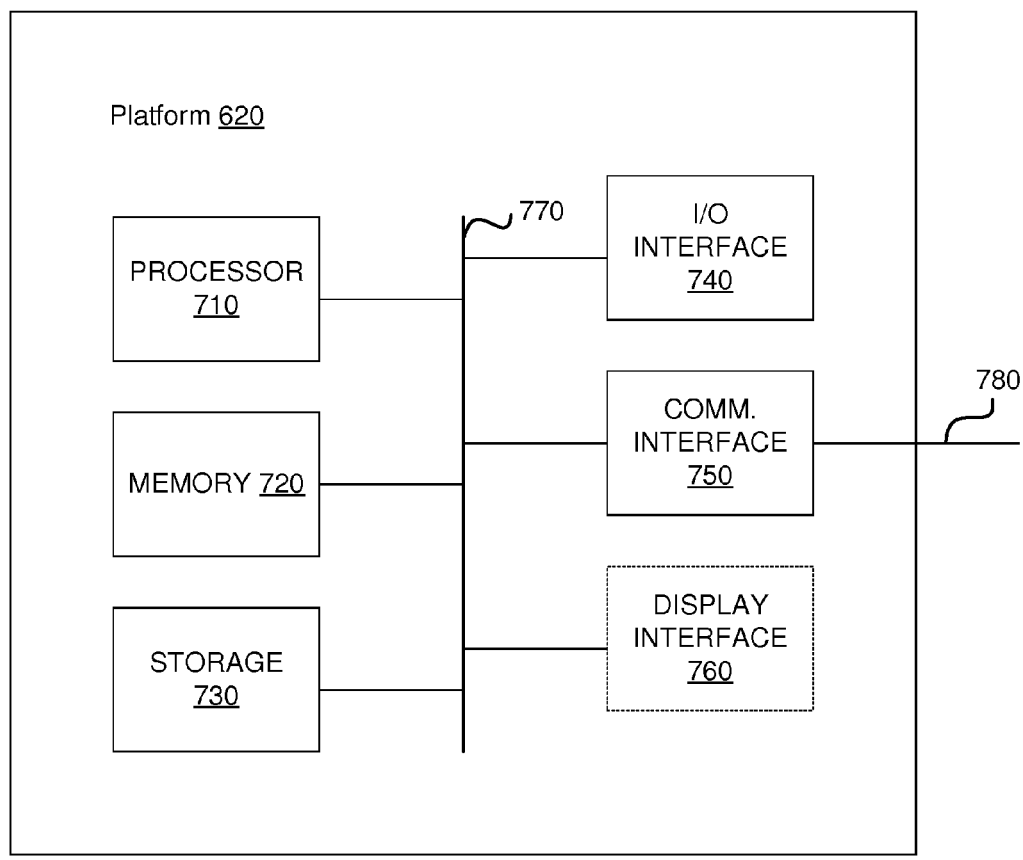
FIG. 7 illustrates a platform, according to some embodiments.

Platform 610 may comprise computing hardware and software configured to perform various computer implemented methods, of which an example is illustrated in FIG. 7. An actuator 620 (e.g., hydraulic cylinder) may move among lengths in its working range to position an apparatus in various configurations in its range of motion.

Sensors 630 may sense, and provide sensor data for, time, global position, weather, environmental measurements, heat, chemical species, radiation, pressure, salinity, pH, biological organisms, and other aspects that may affect parking. Sensors 630 may include security sensors (e.g., motion or light detectors).

Network 640 may include a hardwired network (e.g., LAN, cat-5, Ethernet, optical fiber) and/or a wireless network (802.11, 802.16, EDGE, GSM, CDMA, Bluetooth, and the like). In an exemplary embodiment, actuators 620 control a marine apparatus (e.g., a ship propulsion apparatus (e.g., a propeller, pod, water jet, and the like)) with a subsurface actuator (e.g., a ship steering apparatus (e.g., a rudder, a steering nozzle, a vane, a scoop, and the like) that may be particularly subject to corrosion. Sensors 630 sense the positions of the propulsion and/or steering apparatus, and platform 610 communicates with a command console (e.g., at the bridge) operable to control the vessel.

FIG. 7 illustrates a platform, according to some embodiments. Platform 620 may comprise hardware and software operable to perform unique methods and functions, and thus be a unique machine, notwithstanding any prior existence of various hardware components. In exemplary embodiments, platform 620 includes a variety of hardware components, including processor 710, memory 720, non-transitory storage 730, input/output (I/O) interface 740, communication interface 750, and display interface 760. These components may be generally connected via a system bus 770. Platform 620 may communicate (e.g., with network 640) via communication bus 780. In some embodiments, platform 620 includes a video card and/or display device (not shown).

Processor 710 may comprise any type of processor capable of processing the executable instructions (e.g., integrated circuits). Processor 710 may include a cache, a multi-core processor, a video processor, and/or other processors.

Memory 720 may be any memory (e.g., non-transitory media) configured to store data. An example of memory 720 includes a computer readable storage medium, which may include any medium configured to store executable instructions. For example, the memory 720 may include, but is not limited to, storage devices such as RAM, ROM, MRAM, PRAM, flash memory, and the like.

Storage 730 may be any non-transitory media configured to receive, store, and provide data. Storage 730 may include a hard drive (e.g., having a magnetic disc), a solid-state drive (e.g., having static RAM), a tape drive (e.g, having a magnetic tape), an optical drive (e.g., having an optically read/write disc), and the like. Certain configurations include storage 730 as part of platform 620. In other configurations, storage 730 may be implemented remotely, for example as part of a remotely located database (not shown). Storage 730 may have stored thereon instructions executable by a processor to perform one or more methods described herein. Storage 730 may include a database or other data structure configured to hold and organize data. In some embodiments, platform 620 includes memory 720 in the form of RAM and storage 730 in the form of a solid state drive.

Input and output (I/O) may be implemented via I/O interface 740, which may include hardware and/or software to interface with various remotely located devices such as a user device (e.g., having a keyboard, touchscreen, mouse, pointer, push buttons, and the like). I/O interface 740 may be configured to communicate with a command console used to operate an apparatus.

Communication interface 750 may communicate with various user devices, command consoles, apparatus, actuators, and the like, typically via network 640 (FIG. 6), and may include or be in communication with encryption hardware and/or software. Communication interface 750 may support serial, parallel, USB, firewire, Ethernet, and/or ATA communications. Communication interface 750 may also support 802.11, 802.16, GSM, CDMA, EDGE, GPS, Galileo, and various other wireless communications protocols, including commercial shipping protocols.

Optional display interface 760 may include any circuitry used to control and/or communicate with a display device, command console, and the like, such as an LED display, an OLED display, a CRT, a plasma display, and the like. In some configurations, display interface 760 includes a video card and memory. A display interface may light a signal lamp and/or trigger an audible sound. In some configurations, a user device may include a video card and graphic display, and display interface 760 may communicate with the video card of the user device to display information.

The functionality of various components may include the use of executable instructions, which may be stored in memory 720 and/or non-transitory storage 730. Executable instructions may be retrieved and executed by processor 710, and may include software, firmware, and/or program code.

Figure 8:
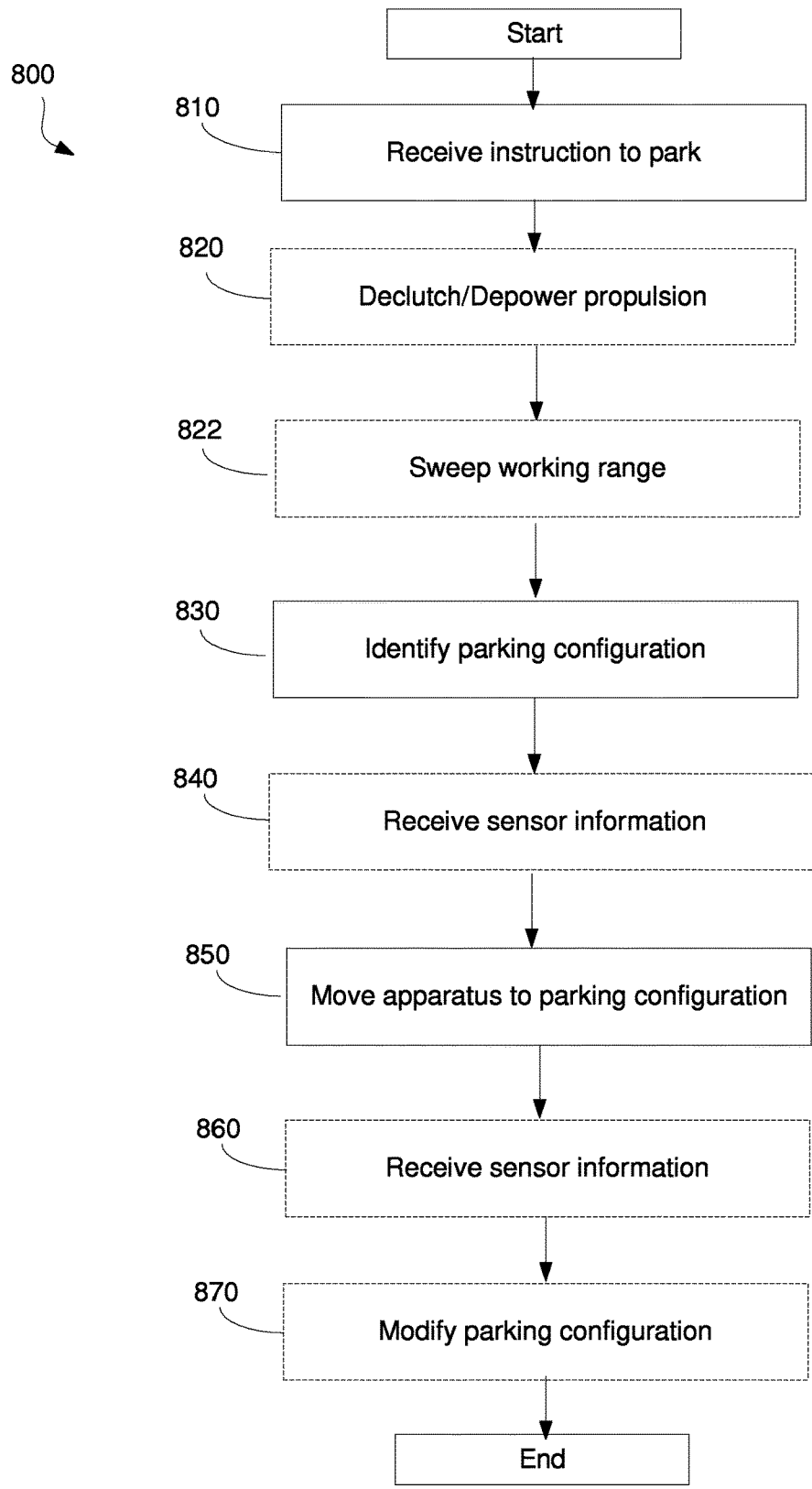
FIG. 8 illustrates a parking procedure, according to some embodiments.

FIG. 8 illustrates a parking procedure, according to some embodiments. Method 800 may be performed (in this example, by platform 610, FIG. 6) to park an apparatus (e.g., 100, 900) controlled by actuators 620 (FIG. 6) such as a hydraulic cylinder (110, FIG. 1, 210, FIG. 2).

In step 810, platform 610 receives an instruction to park (e.g., from a command console). In optional step 820, platform 610 instructs a propulsion system to declutch and/or depower the propulsion system. In optional step 822, platform 610 instructs an actuator to sweep its working range (e.g., to remove marine growth). Step 822 may be performed after various other steps in method 800. In step 830, a parking configuration is identified (e.g., retrieved from storage 730, FIG. 7). In some cases, a parking configuration may be identified by selecting a rarely used configuration.

In step 850, an instruction is sent to an actuator (e.g., an actuator 620) instructing the actuator to move to a position or length that positions the apparatus into a parking configuration. Step 822 may be performed.

In optional steps 840 and/or 860, sensor information is received from a sensor (e.g., a sensor 630). Sensor information may include a position (e.g., whether or not an apparatus is in an expected configuration). In some cases, a sensor 630 provides sensor data that is used to modify instructions sent to an actuator to control position in a "closed loop" fashion.

Sensor information may be used to select a parking configuration (e.g., as in step 840). Sensor information may be used to modify a parking configuration. In optional step 870, a parking configuration is modified (e.g., using sensor information, such as after a period of time). A parking configuration may be modified within a period that does not exceed 1 hour, 1 day, several days, a week, 2 weeks, and/or 1 month. In an exemplary embodiment, a parking position is modified at least once a week, preferably once a day, during the time the apparatus is parked. In some cases, a parking configuration may be modified at least every hour, every minute, or even every 10 seconds. Some parking configurations are modified after a time period not exceeding 5, including 2, seconds. Step 822 may be performed.

In some situations, an apparatus may not achieve a desired parking configuration (e.g., if there is an obstruction). In some embodiments, a sensor senses a configuration of the apparatus, and may provide data to platform 610 that informs of a failure to reach a desired configuration. A user (e.g., of command console 650) may be notified that they system has or has not achieved a desired parking configuration.

Figure 9:
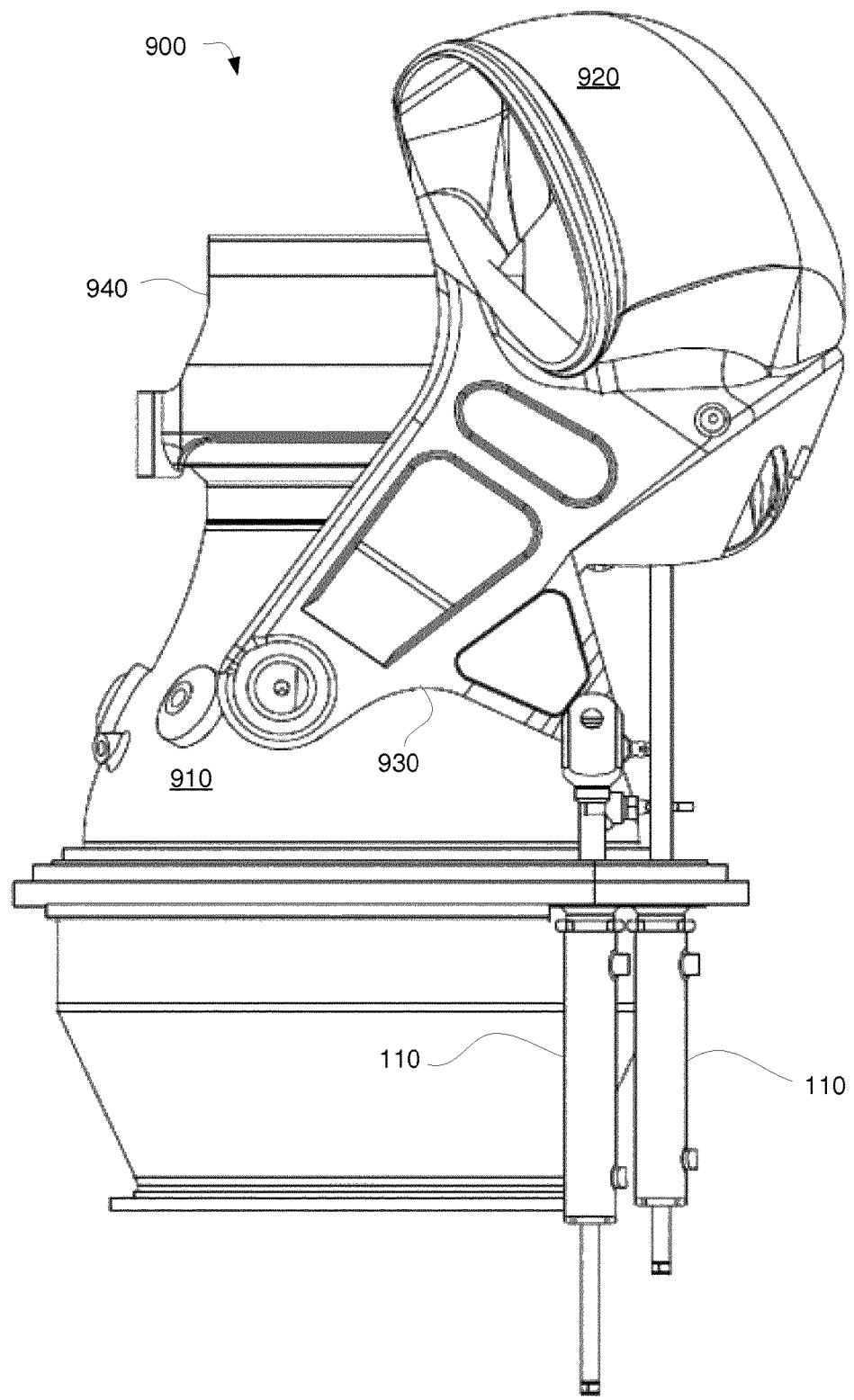
FIG. 9 illustrates an exemplary apparatus, according to some embodiments.

FIG. 9 illustrates an exemplary apparatus, according to some embodiments. Propulsion system 900 may include a water jet 910 to generate a jet of water (e.g., to propel a vessel forward). A scoop 920 may be controllably disposed in the jet to redirect at least a portion of the jet in a forward direction, imparting a reverse thrust on the vessel. The jet flows through nozzle 940, which may be adjusted to redirect the jet in a lateral direction, steering the vessel. Various apparatus may be controlled by actuators (e.g., hydraulic cylinders, electric linear actuators, solenoids, electric motors, and the like). In exemplary system 900, cylinders 110 actuate scoop 920 and nozzle 940 via linkages, of which one is shown. In this example, scoop 920 is actuated via linkage 930, which transmits force and/or displacement from an actuator (e.g., cylinder 110) to an attached component (in this case, scoop 920). An actuator may comprise a control cylinder configured to actuate an apparatus (e.g., a scoop and/or a nozzle). A propulsion apparatus may comprise two scoop actuators (e.g., two scoop control cylinders) configured to actuate the scoop and one nozzle actuator (e.g., one nozzle control cylinder) configured to actuate the nozzle. A propulsion apparatus may comprise one scoop control cylinder configured to actuate the scoop and one nozzle control cylinder configured to actuate the nozzle. Cylinders 110 may be exemplary actuators 620, which may receive instructions from platform 610 (FIG. 6) to park system 900 in a parking configuration.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for parking an apparatus during a period of inactivity, the system comprising:
   an actuator having a working range and configured to be coupled to the apparatus to position the apparatus in a configuration within a range of motion of the apparatus, and
   a platform comprising a computer readable non-transitory storage media coupled to a processor and a communication interface, the platform configured to:
      receive an instruction to park the apparatus from the command console;
      identify a parking configuration for the apparatus in which it is desirable to position the apparatus during the period of inactivity, wherein the parking configuration has a frequency of usage less than a predetermined frequency, the frequency of usage determined from a historical record of at least one of:
         a frequency of configurations in the range of motion of the apparatus, and
         a frequency of lengths in the working range of the actuator, and
      instruct the actuator to move to a length in its working range that positions the apparatus in the parking configuration during the period of inactivity.

2. The system of claim 1, wherein the actuator includes an electrical drive screw configured to be operated in a marine environment.

3. The system of claim 1, wherein instruct includes instruct the actuator to move to a position that is within 10% of an end of the working range.

4. The system of claim 1, wherein instruct includes instruct the actuator includes moving the actuator to a length that is at least 2 mm from an end of the working range.

5. The system of claim 1, wherein the platform is further configured to:
   receive sensor data from a sensor sensing an environment associated with at least one of the actuator and the apparatus; and
   modify the parking configuration according to the sensor data.

6. The system of claim 1, wherein the platform is further configured to:
   receive time data from a time sensor that measures time, and
   modify the parking configuration after a period of time.

7. A propulsion system comprising:
   a water jet configured to generate a jet of water;
   at least one of:
      a scoop configured to controllably redirect the jet of water, and
      a nozzle configured to controllably redirect the jet of water; and
   the system of claim 1, wherein the parking configuration for the apparatus comprises a propulsion parking configuration of the at least one of the scoop and nozzle, and wherein:
      the actuator is coupled to the at least one of the scoop and nozzle, and
      the platform is configured to park the at least one of the scoop and nozzle in the propulsion parking configuration.

8. The propulsion system of claim 7, wherein:
   the scoop is actuated by two scoop control cylinders; and
   the nozzle is actuated by one nozzle control cylinder.

9. A system for parking an apparatus during a period of inactivity, the system comprising:
   an actuator having a working range and configured to be coupled to the apparatus to position the apparatus in a configuration within a range of motion of the apparatus, and
   a platform comprising a computer readable non-transitory storage media coupled to a processor and a communication interface, the platform configured to:
      receive an instruction to park the apparatus from the command console;
      identify a parking configuration for the apparatus in which it is desirable to position the apparatus during the period of inactivity, wherein the parking configuration is determined using data from a benchmark apparatus that is a different apparatus than the apparatus to which the actuator is configured to be coupled, and
      instruct the actuator to move to a length in its working range that positions the apparatus in the parking configuration during the period of inactivity.

10. The system of claim 9, wherein the platform is further configured to send an instruction to declutch or depower a propulsion system configured to communicate with the platform.

11. The system of claim 9, wherein the platform is further configured to:
   receive sensor data from a sensor sensing an environment associated with at least one of the actuator and the apparatus; and
   modify the parking configuration according to the sensor data, and
   wherein the sensor data includes configuration information identifying a configuration of the apparatus, and the platform is further configured to send configuration data that identify whether or not the apparatus has been successfully parked in the parking configuration.

12. The system of claim 9, wherein the actuator includes an electrical drive screw configured to be operated in a marine environment.

13. The system of claim 9, wherein instruct includes instruct the actuator to move to a position that is within 1% of an end of its working range.

14. The system of claim 9, wherein the platform is further configured to:
   receive sensor data from a sensor sensing an environment associated with at least one of the actuator and the apparatus; and
   modify the parking configuration according to the sensor data.

15. The system of claim 9, wherein the platform is further configured to:
   receive time data from a time sensor that measures time, and
   modify the parking configuration after a period of time that is at least one day.

16. A propulsion system comprising:
   a water jet configured to generate a jet of water;
   at least one of:
      a scoop configured to controllably redirect the jet of water, and a nozzle configured to controllably redirect the jet of water; and the system of claim 9, wherein the parking configuration for the apparatus comprises a propulsion parking configuration of the at least one of the scoop and nozzle, and wherein:
- the actuator is coupled to the at least one of the scoop and nozzle, and
- the platform is configured to park the at least one of the scoop and nozzle in the propulsion parking configuration.

17. The propulsion system of claim 16, wherein:
the scoop is actuated by two scoop control cylinders; and
the nozzle is actuated by one nozzle control cylinder.

18. A system for parking an apparatus during a period of inactivity, the system comprising:
an actuator having a working range and configured to be coupled to the apparatus to position the apparatus in a configuration within a range of motion of the apparatus, and
a platform comprising a computer readable non-transitory storage media coupled to a processor and a communication interface, the platform configured to:
receive an instruction to park the apparatus from the command console;
identify a parking configuration for the apparatus in which it is desirable to position the apparatus during the period of inactivity, the parking configuration comprising a plurality of localized positions among which the apparatus moves, and
instruct the actuator to move to a length in its working range that positions the apparatus in the parking configuration during the period of inactivity.

19. The system of claim 18, wherein the platform is further configured to instruct the actuator to move a distance that is at least 5 mm.

20. The system of claim 18, wherein instruct the actuator comprises instruct the actuator to sweep through its full working range.

21. The system of claim 20, wherein instruct the actuator comprises instruct the actuator to sweep through its full working range over a period of time that is at least 1 day.

22. The system of claim 18, wherein the actuator includes an electrical drive screw configured to be operated in a marine environment.

23. The system of claim 18, wherein instruct includes instruct the actuator to move to a position that is within 1% of an end of its working range.

24. The system of claim 18, wherein the platform is further configured to:
receive sensor data from a sensor sensing an environment associated with at least one of the actuator and the apparatus; and
modify the parking configuration according to the sensor data.

25. A propulsion system comprising:
a water jet configured to generate a jet of water;
at least one of:
a scoop configured to controllably redirect the jet of water, and
a nozzle configured to controllably redirect the jet of water; and
the system of claim 18, wherein the parking configuration for the apparatus comprises a propulsion parking configuration of the at least one of the scoop and nozzle, and wherein:
- the actuator is coupled to the at least one of the scoop and nozzle, and
- the platform is configured to park the at least one of the scoop and nozzle in the propulsion parking configuration.

26. The propulsion system of claim 25, wherein:
the scoop is actuated by two scoop control cylinders; and
the nozzle is actuated by one nozzle control cylinder.

* * * * *